(12) United States Patent
Jun et al.

(10) Patent No.: US 9,505,660 B2
(45) Date of Patent: Nov. 29, 2016

(54) INORGANIC BINDER COMPOSITION FOR MOLDING SAND

(71) Applicants: PR TECH CO., LTD., Ansan-si (KR); DAEJONG FACTORY AUTOMATON CO., LTD., Siheung-si (KR)

(72) Inventors: Young Sig Jun, Ansan-si (KR); Sung Hoon Cho, Ansan-si (KR)

(73) Assignees: PR TECH CO., LTD. (KR); DAEJONG FACTORY AUTOMATON CO., LTD. (KR)

( * ) Notice: Subject to any disclaimer, the term of this patent is extended or adjusted under 35 U.S.C. 154(b) by 0 days.

(21) Appl. No.: 15/066,287

(22) Filed: Mar. 10, 2016

(65) Prior Publication Data

US 2016/0264469 A1  Sep. 15, 2016

(30) Foreign Application Priority Data

Mar. 10, 2015 (KR) .......................... 10-2015-0033256

(51) Int. Cl.
*B22C 1/18* (2006.01)
*C04B 28/26* (2006.01)

(52) U.S. Cl.
CPC .................................... *C04B 28/26* (2013.01)

(58) Field of Classification Search
CPC .......... B22C 1/18; B22C 1/188; C04B 28/26
See application file for complete search history.

(56) References Cited

U.S. PATENT DOCUMENTS

| 5,473,009 A | * | 12/1995 | Kimura | ................... B22C 1/167 523/142 |
| 7,712,516 B2 | | 5/2010 | Gerlach | |
| 8,006,745 B2 | * | 8/2011 | Gerlach | ................. B22C 1/188 164/349 |

FOREIGN PATENT DOCUMENTS

| CN | 1453082 A | * | 11/2003 |
| JP | 2008511447 | | 4/2008 |
| JP | 4298806 | | 7/2009 |
| KR | 101199111 | | 11/2012 |

* cited by examiner

*Primary Examiner* — Anthony J Green
(74) *Attorney, Agent, or Firm* — Cantor Colburn LLP

(57) ABSTRACT

Provided is an inorganic binder composition for molding sand which includes a modified alkali silicate mixture, a hardening agent, a cross-linking agent and a rheology control agent. The inorganic binder composition may control hygroscopicity (deliquescence) of alkali silicate and keep strength steadily by polymerizing alkali silicate by the hardening agent and cross-linking it by the cross linking agent to form a hardened silicate coating (film) which may suppress generation of moisture.

9 Claims, 3 Drawing Sheets

INORGANIC BINDER COMPOSITION FOR MOLDING SAND

TECHNICAL FIELD

The present invention relates to an inorganic binder composition for molding sand and particularly to an inorganic binder composition for molding sand including alkali silicate.

TECHNICAL BACKGROUND

Sand casting means injecting a molten metal into the mold space manufactured by using sands (or molding sands) and then solidifying the molten metal to obtain the product of a desirous shape.

During sand casting, a binder is used for binding molding sands. Conventional organic binders such as phenol, isocyanate, ester, and furan resins have the advantage of a rapid hardening rate. However reclamation of used molding sands is hard and such organic binders may produce odors and poisonous gases and the like, thus having the demerits causing adverse effect on the molding environment and the environmental problem.

Accordingly, the research is being carried out to use inorganic binders. In particular, the research as to inorganic binders which include alkali silicate as a main ingredient is actively being carried out. Inorganic binders including alkali silicate as the main ingredient cause a small amount of odors and gases, and thus have the advantages of being capable of preserving hygiene and safety of workers and the environment and of being capable of reusing molding sands while such inorganic binders have the problem that due to their peculiar hygroscopicity binding force weakens and strength reduces rapidly.

U.S. Pat. No. 7,712,516 discloses that use of alkali silicate and amorphous silicon oxide increases flowability of core sand without reduction of strength, thus enhancing the performance of a core but is hard to completely supplement the reduction of strength due to moisture of amorphous silicon oxide.

In addition, Korean Patent No. 10-1199111 discloses a core material mixture for casting comprising alkali silicate binder and oxide film inhibitor and a method of preventing hygroscopicity of alkali silicate due to oxide film inhibitor. However the above invention has the problem of being hard to control hygroscopicity when a coating such as a complete film is not created.

SUMMARY OF THE INVENTION

To solve the problems caused in case conventional organic and inorganic binders is used, an inorganic binder composition according to the present invention may control hygroscopicity (deliquescence) of alkali silicate and keep strength by polymerizing alkali silicate by a hardening agent and crosslinking it by cross linking agent to form a hardened silicate coating (film) which may suppress generation of moisture.

The present invention is directed to an inorganic binder composition for molding sand wherein said inorganic binder composition comprises a modified alkali silicate mixture, a hardening agent, a cross-linking agent and a rheology control agent wherein said modified alkali silicate mixture comprises at least one of alkali silicate selected the group consisting of sodium silicate, potassium silicate and lithium silicate.

Preferably, the inorganic binder composition comprises 3 to 7 parts by weight of a modified alkali silicate mixture, 0.5 to 5 parts by weight of a hardening agent, 0.5 to 3 parts by weight by a cross-linking agent and 0.1 to 2 parts by weight of a rheology control agent, relative to 100 parts by weight of molding sand.

Preferably, the modified alkali silicate mixture comprises alkali silicate, potassium hydroxide, surfactant and isopropyl alcohol.

Preferably, the modified alkali silicate mixture comprises 100 parts by weight of alkali silicate, 1 to 10 parts by weight of potassium hydroxide, 0.1 to 2 parts by weight of surfactant and 1 to 5 parts by weight of isopropyl alcohol.

Preferably, the hardening agent comprises at least one selected from the group consisting of: i) inorganic salt selected from the group consisting of sodium pyrophosphate, CaCl2, Ca(OH)2, $Mg(OH)_2$, $Na_2CO_3$ and $NaH_2BO_3$, ii) organic acid selected from the group consisting of acetic acid, citric acid and ethylene glycol diacetate, iii) inorganic acid selected from the group consisting of sulfuric acid and hydrochloric acid, iv) metal oxide selected from the group consisting of ZnO, CaO and MgO, and v) organic compound selected from the group consisting of carbon dioxide and propylene carbonate.

Preferably, the cross-linking agent is silane coupling agent or alcohol.

Preferably, the rheology control agent comprises at least one species selected from the group consisting of solid lubricant, wax, surfactant, glycol and ester.

Preferably, the modified alkali silicate mixture has the viscosity of 50 to 300 cps.

Preferably, the hardening agent is ZnO and the cross-linking agent is tetraethyl orthosilicate.

Preferably, the rheology control agent is graphite.

The inorganic binder composition according to the present invention may improve greatly hygiene and safety of workers and atmosphere environmental contamination through decreased release of odors, poisonous gases and the like and may also prevent a secondary pollution occurring after using an organic binder, by using alkali silicate as an inorganic-based polymer.

In addition, according to the present invention, strength decrease of produced castings may be prevented and in particular the quality of molds and cores may be greatly improved.

Furthermore, due to surface films formed through the chemical hardening, fixation of molding sands to the finished castings may be prevented thereby to enable molding sands to be easily removed.

In addition, the present invention may enhance flowability (rheology) of the binder by maintaining viscosity of the binder composition greatly low, thus enabling the continuous works in the machine (press) and as a result may improve the productivity. Further, the flowability enables the dense structure of molding sands thus to be capable of keeping surface hardness and bending strength (fracture strength).

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which:

FIG. 2B represents a chemical hardening reaction occurring by a hardening agent, a cross-linking agent and the like.

DETAILED DESCRIPTION OF EXEMPLARY EMBODIMENTS

Figure 1:
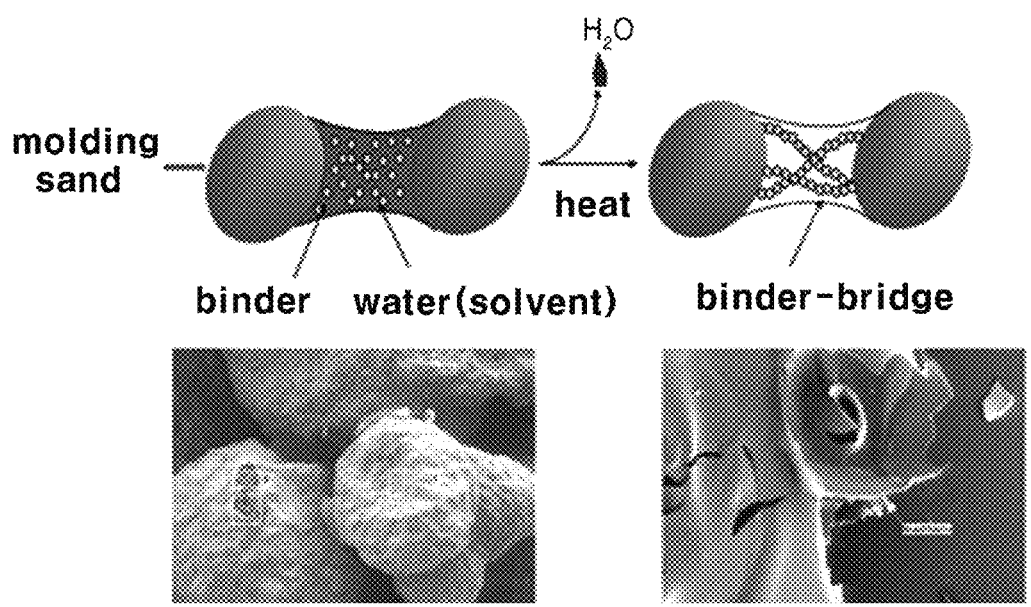
FIG. 1 is a mimetic diagram representing a process in which molding sands are bound when an inorganic binder composition according to the present invention is used.

All technical terms, unless otherwise defined, have the following definitions and coincide with the meanings which a person skilled in the relevant field of the present invention generally understands. Further although preferable methods or specimen are described in the specification, the similar matters or equivalents thereof are included in the scope of the present invention.

The present invention is directed to an inorganic binder composition for molding sand wherein the inorganic binder composition comprises a modified alkali silicate mixture, a hardening agent, a cross-linking agent and a rheology control agent Specifically, the inorganic binder composition comprises 3 to 7 parts by weight of a modified alkali silicate mixture, 0.5 to 5 parts by weight of a hardening agent, 0.5 to 3 parts by weight by a cross-linking agent and 0.1 to 2 parts by weight of a rheology control agent, relative to 100 parts by weight of molding sand.

The term "alkali silicate (water glass)" used herein means material obtained by melting silicon dioxide and alkali metal. Also, the term "modified alkali silicate mixture" used herein means a mixture which includes alkali silicate.

The modified alkali silicate mixture includes alkali silicate. The alkali silicate is one species selected from the group consisting of sodium silicate, potassium silicate and lithium silicate. Preferably the alkali silicate is sodium silicate or potassium silicate. However, the modified alkali silicate mixture is not limited thereto and may include all alkali silicates which may achieve the object of the present invention.

Based on 100 parts by weight of molding sand, 3 to 7 parts by weight of modified alkali silicate mixture, preferably 4 to 6 by weight of modified alkali silicate mixture is included. When the modified alkali silicate mixture is included in an amount of less than 3 parts by weight, the binding force necessary for binding molding sands is weak while when it is included in an amount of at least 7 parts by weight, there is the problem in cost versus performance and there is a difficulty in removing molding sands due to the increased strength.

The modified alkali silicate mixture may include alkali silicate, potassium hydroxide, surfactant and isopropyl alcohol. The modified alkali silicate mixture may include 100 parts by weight of alkali silicate, 1 to 10 parts by weight of potassium hydroxide, 0.1 to 2 parts by weight of surfactant and 1 to 5 parts by weight of isopropyl alcohol. Potassium hydroxide may be used as a viscosity controlling agent. When potassium hydroxide is included in an amount of less than 1 part by weight, the effect thereof is insignificant while when it is included in an amount of more than 10 parts by weight there is the problem of impeding the binding force of molding sands. Surfactant may be used as a viscosity and rheology control agent. When it is included in an amount of less than 0.1 parts by weight the effect thereof is insignificant while it is included in an amount of more than 2 parts by weight there is the problem of rather impeding flowability due to formation of excessive bubbles.

Isopropyl alcohol may be used as a viscosity controlling and cross-linking agent. When it is included in an amount of less than 1 part by weight the effect thereof is insignificant while when it is included in an amount of more than 5 parts by weight there occurs the problem of lowering the physical property.

The viscosity of modified alkali silicate mixture may be 50 to 300 pcs, preferably 100 to 200 cps. The viscosity according to the present invention was measured by a blookfield viscometer. The inorganic binder according to the present invention has the advantages that flowability thereof is improved, thus enabling the continuous works in the machine and as a result the productivity is improved, and also the followability makes the structure of molding sands dense thus to be capable of keeping surface hardness and bending strength (fracture strength) steadily.

FIG. 1 is a mimetic diagram representing a process in which molding sands are bound when an inorganic binder composition according to the present invention is used. As shown in FIG. 1, a binding between molding sands is formed by the binder and then a binder-bridge is created while moisture is removed by means of heating, pressurization and the like.

The hardening agent may be included in an amount of from 0.5 to 5 parts by weight, and preferably from 1 to 3 parts by weight, relative to 100 parts by weight of molding sand. When the hardening agent is included in an amount of less than 0.5 parts by weight, the effect thereof is insignificant while when it is included in an amount of more than 5 parts by weight, due to the excessive increase of strength it is difficult that the molding sands are removed from the mold.

The hardening agent may be selected from the group consisting of: i) inorganic salt selected from the group consisting of sodium pyrophosphate, $CaCl_2$, $Ca(OH)_2$, $Mg(OH)_2$, $Na_2CO_3$ and $NaH_2BO_3$, ii) organic acid selected from the group consisting of acetic acid, citric acid and ethylene glycol diacetate, iii) inorganic acid selected from the group consisting of sulfuric acid and hydrochloric acid, iv) metal oxide selected from the group consisting of ZnO, CaO and MgO, and v) organic compound selected from the group consisting of carbon dioxide and propylene carbonate. Preferably, the hardening agent may be metal oxide or inorganic salt. More preferably the hardening agent may be ZnO or sodium pyrophosphate. However, it is not limited thereto and may include all hardening agents for achieving the object of the present invention.

The cross-linking agent may be included in an amount of from 0.5 to 35 parts by weight, relative to 100 parts by weight of molding sand. Preferably it may be included in an amount of from 1 to 2 parts by weight, relative to 100 parts by weight of molding sand. When the cross-linking agent is included in an amount of less than 0.5 parts by weight the chemical cross-linking phenomenon does not occur while when it is included in an amount of more than 3 parts by weight there may occur the problem in terms of the mechanical removability of molding sand particles and moldability.

Cross-linking agent may be a silane coupling agent or alcohol. The silane coupling agent may be tetraalkoxy silane coupling agent, preferably tetramethyl orthosilicate, tetraethyl orthosilicate, tetrapropyl orthosilicate, or tetrabutyl orthosilicate, more preferably tetraethyl orthosilicate (TEOS). Or the silane coupling agent may be gamma-aminopropyltrimethoxysilane, N-beta-(aminoethyl)-gamma-aminopropyltrimethoxysilane, gamma-aminopropylmethyldiethoxysilane, gamma-aminopropylmethyldimethoxysilane, N-beta-(aminoethyl)-gamma-aminopropylmethyldimethoxysilane, gamma-Glycidoxylpropyltrimethoxysilane, gamma-Methacryloxypropyl-trimethoxysilane, Methyltrimethoxysilane, Bis-(3-(triethoxysily)-propyl)tetrasulfane, Bis-(3-(triethoxysily)-propyl)disulfane, gamma-Mercaptopropyltrimethoxysilane, Vinyl-tris-(2-methoxyethoxy)silane, Vinyl-tris-(ethoxy)silane, or Vinyl-tris-(methoxy)silane. The alcohol may include ethyl alcohol, butyl alcohol, isopropyl alcohol and the like.

Rheology control agent (rheology control agent) means material of controlling viscosity and flowability. Rheology control agent may be included in an amount of from 0.1 to 2 parts by weight, preferably 0.1 to 1 parts by weight, relative to 100 parts by weight of molding sand. When rheology control agent is included in an amount of less than 0.1 parts by weight the effect thereof of controlling viscosity and flowability is insignificant while when it is included in an amount of more than 2 parts by weight there is the problem that it affects removal of molding sands and moldability since it is not suitable for being used in an inorganic binder composition.

Rheology control agent may be at least one selected from the group consisting of solid lubricant, wax, surfactant, glycol and ester. The solid lubricant means lubricant of material being a solid phase and having a low point resistance. Graphite, mica, talc, boric acid, zinc oxide, plumbic oxide, sulfur, molybdendisulphide, polytetrafluoroethylene (PTFE), hexagonal boron nitride (hBN), hydro-tetramethyl-ammonium (TATM) and the like may be used as solid lubricant. More preferably, the solid lubricant may be hydro-tetramethylammonium or graphite. The wax is a water-insoluble higher mono- or di-fatty acid ester. The surfactant includes all surfactants such as anionic surfactants, cationic surfactants, amphoteric surfactants and nonionic surfactants. The anionic surfactants may include soap (sodium fatty acid) ($RCOO^- Na^+$), monoalkyl sulfate ($ROSO_3^- M^+$), alkylpolyoxyethylene sulfate ($RO(CH_2CH_2O)_mSO_3^- M^+$), alkylbenzene sulfonic acid salt ($RR'CH_2CHC_6H_4SO_3^-M^+$), monoalkyl phosphate ($ROPO(OH)O^-X^+$) The cationic surfactants may include diakyl dimethyl ammonium salt ($RR'N^+(CH_3)_2X^-$) and alkyl benzyl methyl ammonium salt ($RN^+(CH_2Ph)(CH_3)_2X^-$). The amphoteric surfactants may include alkyl sulfobetaine ($RR'R''N^+(CH_2)_nSO_3$) and alkyl carboxylbetaine ($R(CH_3)_2N^+CH_2COO^-$). The nonionic surfactants may include polyoxyethylene alkyl ether ($RO(CH_2CH_2O)_mH$), fatty acid sorbitan ester, fatty acid diethanolamine ($RCON(CH_2CH_2OH)_2$) and alkyl monoglyceryl ether ($ROCH_2CH(OH)CH_2OH$).

In addition, molding sands used in the present invention mean sands used in a casting process. The molding sands of the present invention may include all available molding sands, preferably Zircon sand, Olivine sand and Chromite sand.

The inorganic binder composition according to the present invention is fabricated by mixing an alkali silicate, potassium hydroxide, surfactant and isopropyl alcohol by means of a mixer to fabricate a modified alkali silicate mixture and then mixing (mulling) molding sands, the modified alkali silicate mixture, a hardening agent, a cross-linking agent and a rheology control agent by a mixer. In case modified alkali silicate mixture and a hardening agent, cross-linking agent and rheology control agent are mixed at the same time, the early cross-linking phenomenon due to a hardening agent and a cross-linking agent may be generated and bubbles due to a rheology control agent may also be generated.

The produced inorganic binder composition is transferred pneumatically or hydraulically into a mold; then there heated and pressurized at a certain pressure and at a relatively low temperature (140 to 160° C.); and hardened. As a result a mold (or a core) is fabricated. By utilizing the produced mold, iron casting products, aluminum casting products and the like may be manufactured. However, the production method is not limited to the above method and all methods generally used may be utilized.

Figure 2A:
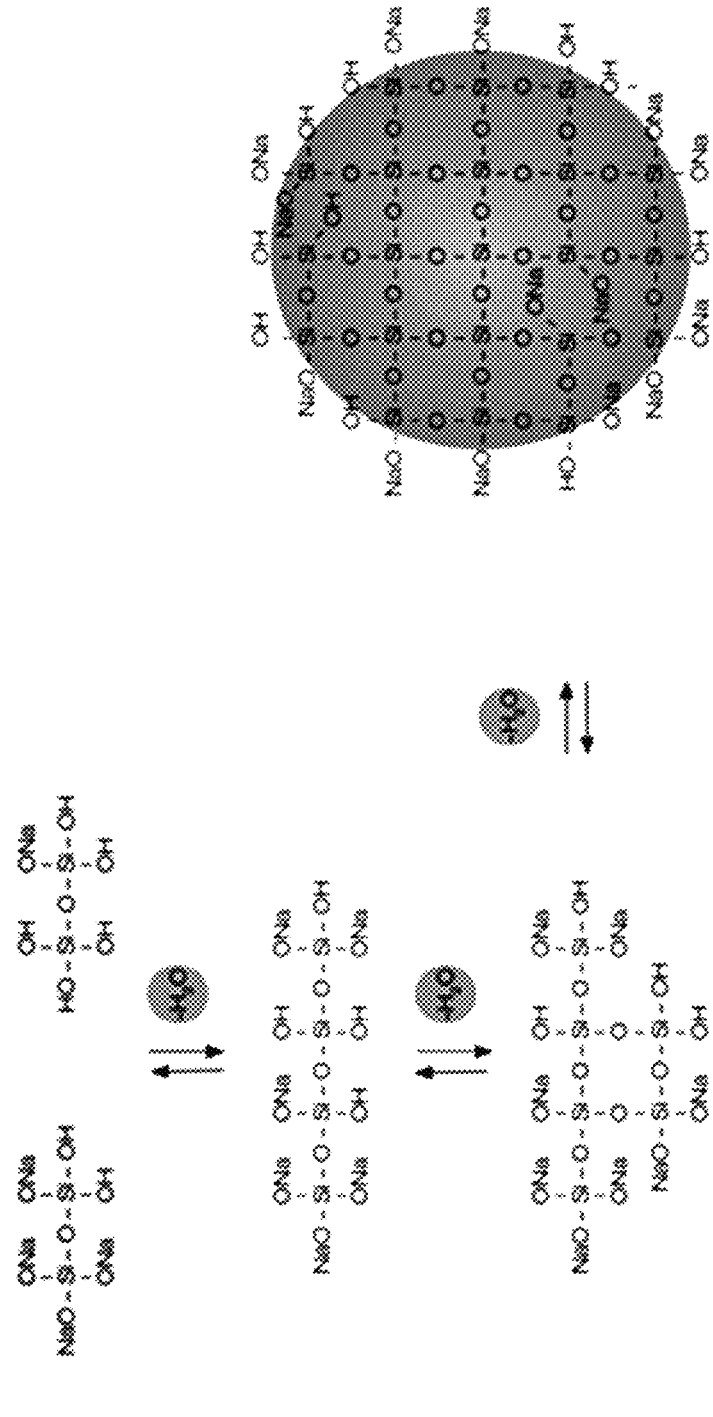
FIG. 2A represents a thermal hardening reaction by a physical action such as heating.
Figure 2B:
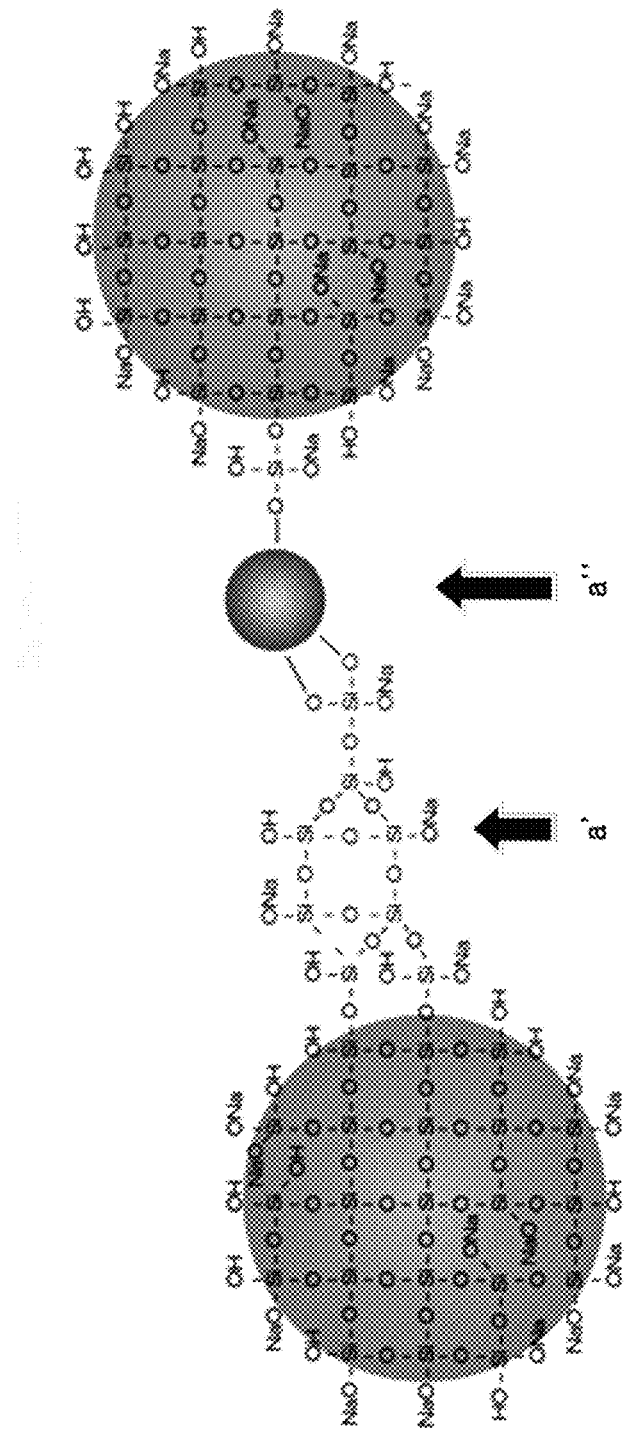

FIG. 2A represents a physical hardening reaction of an inorganic binder composition. In case heating, pressurizing and the like are applied to an inorganic binder composition, moisture is removed and a physical hardening reaction occurs but such a reaction absorbs the moisture within air reversibly due to deliquescence of alkali silicates, etc., (a reversible reaction) and thus de-polymerization occurs. As a result there occurs the problem that strength of the hardened product decreases. However, in the inorganic binder composition according to the present invention, as well as a physical hardening reaction, a chemical hardening reaction and a cross-linking reaction (chemical reaction) occur due to the hardening agent and the cross-linking agent. For this reason the compound is polymerized and gelled and the film is also formed. Accordingly the moisture absorption may be prevented. FIG. 2B represents a chemical hardening reaction occurring by the hardening agent, the cross-linking agent and the like. In case tetraethyl orthosilicate is used as the cross-linking agent (arrow a') in one embodiment of the present invention, it is shown that the cross-linking phenomenon occurs. The arrow a" shows schematically the case which a silane coupling agent or alcohol is used in another embodiment according to the present invention.

Hereinafter, the present invention will be described in detail through embodiments and comparative examples. These embodiments are intended for the specific explanation and the scope of the invention is not limited thereto.

1. COMPARATIVE EXAMPLES 1 TO 5

In Comparative Examples 1 to 5, a modified alkali silicate mixture as in the present invention is not prepared separately. An inorganic binder composition is fabricated by mixing ingredients shown in TABLE 1 below. Weight parts (Parts by weight) of the ingredients shown in TABLE 1 are based on 100 parts of weight of molding sand. Natural sands (bank sands) were used as the molding sand. The prepared binder composition was mixed with 1 kg of molding sand. The hardening condition and the mixing condition are as shown in TABLE 1. The mixer used in Comparative Examples and Working Examples is a planetary mixer of the Korean company Daejong FA.

TABLE 1

| | (Parts by Weight) | | | | |
|---|---|---|---|---|---|
| Material Name | Comparative Example 1 | Comparative Example 2 | Comparative Example 3 | Comparative Example 4 | Comparative Example 5 |
| Molding sand | 100 | 100 | 100 | 100 | 100 |
| Sodium Silicate | 3.136 | 2.83 | 6.5 | 1.83 | 3.01 |
| Kaolin | — | — | 10 | — | — |

TABLE 1-continued (Parts by Weight)

| Material Name | Comparative Example 1 | Comparative Example 2 | Comparative Example 3 | Comparative Example 4 | Comparative Example 5 |
|---|---|---|---|---|---|
| ZnO | 0.2 | 0.4 | 5 | — | 1 |
| Water | — | — | — | 0.018 | 4.71 |
| Graphite | — | — | — | 0.018 | 0.94 |
| Sodium Pyrophosphate | — | — | — | 0.2 | — |
| Potassium Hydroxide | 0.064 | 0.17 | — | — | 0.5 |
| Total Parts By Weight of Binder | 3.4 | 3.4 | 21.5 | 2.066 | 10.16 |
| Hardening Condition | 140° C., 1 minute | 140° C., 1 minute | 140° C., 1 minute | 140° C., 1 minute | 140° C., 1 minute |
| Mixing Condition | Mixer, 5 Minutes | Mixer, 5 Minutes | Mixer, 5 Minutes | Mixer, 5 Minutes | Mixer, 5 Minutes |
| Mixed State | ◎ | ◎ | X | ◎ | ◎ |
| Appearance after Molded | ◎ | ◎ | X | ◎ | ○ |
| Strength Decrease after 48 Hours | Δ | ◎ | X | Δ | ○ |
| Molded-in State | Partially not molded | Partially not molded | Not molded | Pin holes Present | Not molded |

Mixed state is confirmed and evaluated by a magnifying glass of magnification ×100 and a visual check.
◎: Good State, ○: Normal State, ×: Bad State
Appearance state after molded was confirmed by a magnifying glass of magnification ×100 and a visual check.
◎: Good State, ○: Normal State, ×: Bad State
The decrease of strength after 48 hours was evaluated according to the relative evaluation of bending strength by means of a tensile tester.
◎: No breaking[fracture], Δ: Partially Broken (Partially Fracture), ×: Broken (Fractured)
Molded-in state is confirmed and evaluated by a magnifying glass of magnification ×100 and a visual check.

2. FORMULATION EXAMPLES 1 AND 2

TABLE 2 shows the composition of a modified alkali silicate mixture of formulation examples 1 and 2. The composition was mixed by a planetary mixer of Daejong FA in Korea. As the surfactant, an anionic surfactant, alkylbenzene sulfonic acid salt was used. Weight parts (Parts by weight) of the ingredients shown in TABLE 2 are based on 100 parts by weight of alkali silicate. The viscosity was measured by the Blookfield viscometer (Spindle No.2, Units: cps).

TABLE 2

(Parts by Weight)

| Material Name | Formulation Example 1 | Formulation Example 2 |
|---|---|---|
| Sodium Silicate | 100 | — |
| Potassium Silicate | — | 100 |
| potassium hydroxide | 5 | 5 |
| Alkylbenzene sulfonic acid salt | 1 | 1 |
| Isopropyl alcohol | 3 | 3 |
| Total weight part of modified alkali silicate mixture | 109 | 109 |
| Viscosity | 120 | 100 |

3. WORKING EXAMPLES 1 AND 2 AND COMPARATIVE EXAMPLES 6 AND 7

TABLE 3 represents the composition of the inorganic binder of Comparative Examples 6 and 7 and Working Examples 1 and 1 and physical property of the castings fabricated using these. 1 Kg of molding sand, a modified alkali silicate mixture (Formulation Examples 1 and 2) mixed as shown in TABLE 2, a cross-linking agent, a hardening agent, a rheology control agent were mixed by a planetary mixer of Daejong FA in Korea, according to the composition shown in TABLE 3. As graphite, flaky graphite containing 99.5 parts by weight of carbon was used. Weight parts (Parts by weight) shown in TABLE 3 are based on 100 parts by weight of molding sand. Sand castings were fabricated according to the normal method and the hardening condition and the like were presented in TABLE 3.

TABLE 3

(Parts by Weight)

| | Working Example 1 | Working Example 2 | Comparative Example 6 | Comparative Example 7 |
|---|---|---|---|---|
| molding sand | 100 | 100 | 100 | 100 |
| Formulation Example 1 | 4 | | 4 | 4 |
| Formulation Example 2 | | 4 | | |
| Tetraethyl Orthosilicate | 2 | 2 | 2 | 2 |
| ZnO | 1.3 | 1.2 | 1.3 | 1.2 |
| Graphite | 0.48 | 0.48 | | |
| Total Weight Part of Binder | 7.78 | 7.68 | 7.3 | 7.2 |
| Hardening Condition | 150° C., 1 minute | 150° C., 1 minute | 150° C., 1 minute | 150° C., 1 minute |
| Temperature of heated-Air | 155 ± 5° C. | 155 ± 5° C. | 155 ± 5° C. | 155 ± 5° C. |

TABLE 3-continued (Parts by Weight)

|  | Working Example 1 | Working Example 2 | Comparative Example 6 | Comparative Example 7 |
|---|---|---|---|---|
| Mold Temperature | 150 ± 5° C. | 150 ± 5° C. | 150 ± 5° C. | 150 ± 5° C. |
| Machine Temperature | 5-6 kg/cm² | 5-6 kg/cm² | 5-6 kg/cm² | 5-6 kg/cm² |
| Mixing Method | Mixer, 5 minutes | Mixer, 5 minutes | Mixer, 5 minutes | Mixer, 5 minutes |
| Mixed State | ◎ | ◎ | ◎ | ◎ |
| Appearance after Molded | ◎ | ◎ | ◎ | ◎ |
| Strength Decline after 48 hours | ◎ | ◎ | ◎ | ◎ |
| Molded-in State | Complete | Complete | Partially not molded | Partially not molded |
| Knock out (Mechanical removal of sand) | Possible | Possible | Possible | Possible |

Mixed state, appearance after molded, Strength decline after 48 hours and a molded-in state were evaluated in the same method as the above described method.

Knock out(Breaking up of sand): whether molding sand particles are removed was evaluated by Crusher Machine.

As noted from TABLES 1 and 3, in case the inorganic binder according to the present invention is used, the properties in all fields such as mixed state, the appearance, the molded-in state and the knock out are excellent.

What is claimed is:

1. An inorganic binder composition for molding sand comprising:
    a modified alkali silicate mixture,
    a hardening agent,
    a cross-linking agent and
    a rheology control agent,
    wherein the modified alkali silicate mixture comprises at least one of alkali silicate selected the group consisting of sodium silicate, potassium silicate and lithium silicate, and wherein the cross-linking agent is tetraethyl orthosilicate.

2. The inorganic binder composition for molding sand of claim 1, wherein the inorganic binder composition comprises 3 to 7 parts by weight of a modified alkali silicate mixture, 0.5 to 5 parts by weight of a hardening agent, 0.5 to 3 parts by weight by a cross-linking agent and 0.1 to 2 parts by weight of a rheology control agent, relative to 100 parts by weight of molding sand.

3. The inorganic binder composition for molding sand of claim 1,
    wherein the modified alkali silicate mixture comprises alkali silicate, potassium hydroxide, surfactant and isopropyl alcohol.

4. The inorganic binder composition for molding sand of claim 3,
    wherein the modified alkali silicate mixture comprises 100 parts by weight of alkali silicate, 1 to 10 parts by weight of potassium hydroxide, 0.1 to 2 parts by weight of surfactant and 1 to 5 parts by weight of isopropyl alcohol.

5. The inorganic binder composition for molding sand of claim 1,
    wherein the hardening agent comprising at least one selected from the group consisting of:
    i) inorganic salt selected from the group consisting of sodium pyrophosphate, CaCl2, Ca(OH)2, Mg(OH)2, Na2CO3 and NaH2BO3;
    ii) organic acid selected from the group consisting of acetic acid, citric acid and ethylene glycol diacetate;
    iii) inorganic acid selected from the group consisting of sulfuric acid and hydrochloric acid;
    iv) metal oxide selected from the group consisting of ZnO, CaO and MgO, and;
    v) organic compound selected from the group consisting of carbon dioxide and propylene carbonate.

6. The inorganic binder composition for molding sand of claim 1,
    wherein the rheology control agent comprises at least one selected from the group consisting of solid lubricant, wax, surfactant, glycol and ester.

7. The inorganic binder composition for molding sand of claim 1,
    wherein the modified alkali silicate mixture has the viscosity of 50 to 300 cps.

8. The inorganic binder composition for molding sand of claim 1,
    wherein the hardening agent is ZnO.

9. The inorganic binder composition for molding sand of claim 1,
    wherein the rheology control agent is graphite.

* * * * *